United States Patent
Cortinovis

(10) Patent No.: US 6,994,558 B2
(45) Date of Patent: Feb. 7, 2006

(54) SYSTEM FOR FIXING AN ELECTRICAL CONNECTOR TO A DISK-BRAKE CALIPER

(75) Inventor: Gianpaolo Cortinovis, Dalmine (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 10/496,247

(22) PCT Filed: Nov. 27, 2001

(86) PCT No.: PCT/IT01/00597

§ 371 (c)(1),
(2), (4) Date: May 19, 2004

(87) PCT Pub. No.: WO03/046403

PCT Pub. Date: Jun. 5, 2003

(65) Prior Publication Data

US 2005/0014393 A1    Jan. 20, 2005

(51) Int. Cl.
*H01R 13/73* (2006.01)
(52) U.S. Cl. .................. 439/34; 439/912; 439/913; 439/532; 439/575
(58) Field of Classification Search .............. 439/34, 439/912, 913, 532, 542, 574, 575; 188/1.11 L, 188/1.11 E
See application file for complete search history.

(56) References Cited

U.S. PATENT DOCUMENTS 4,850,454 A    7/1989 Korody
5,404,970 A    4/1995 Fuchs et al.
5,678,661 A  * 10/1997 Kim ...................... 188/1.11 E
6,481,539 B1* 11/2002 Shaw et al. ............. 188/1.11 L

FOREIGN PATENT DOCUMENTS

| DE | 2132913 | 1/1973 |
| DE | 3926437 | 2/1991 |
| EP | 0757188 | 2/1997 |
| FR | 2766299 | 7/1998 |

* cited by examiner

Primary Examiner—Gary Paumen
(74) Attorney, Agent, or Firm—Sofer&Haroun,LLP

(57) ABSTRACT

A system for fixing an electrical connector (16) to a disk-brake caliper (10) comprising a wear sensor electrically connector to the electrical connector is described. To prevent the connector (16) and/or the wires (15) which extend therefrom or which have to be connected thereto obstructing the assembly of the caliper (10) and its mounting on the hub-carrier of the vehicle, the fixing system comprises a support block (21) firmly fixed to the caliper (10) and having an at least partially-threaded through-hole (21a), a coupling element (20), and a screw (22) for fixing the coupling element (20) to the support block (21), the coupling element (20) comprising a portion (20b) for fixing to the connector (16) and a portion (20a) for fixing to the support block, the latter portion (20a) having the shape of a stirrup which has, in one arm, a nib (20d) opposite the hole, and which has dimensions such as to be connected to the block (21) by being fitted around it, enabling the nib (20d) to be snap-fitted in the hole (21a) in the block (21).

6 Claims, 2 Drawing Sheets

SYSTEM FOR FIXING AN ELECTRICAL CONNECTOR TO A DISK-BRAKE CALIPER

RELATED APPLICATION

This application is a National Phase Application of PCT Patent Application No. PCT/IT01/00597, the entirety of which are incorporated herein by reference.

FIELD OF THE INVENTION

The present invention relates to disk brakes and, more particularly, to a system for fixing an electrical connector to a disk-brake caliper, as defined in the preamble of claim 1.

BACKGROUND OF THE INVENTION

It is known and is usual for both disk and drum brakes to be provided with devices, generally known as wear indicators, which can detect the state of wear of the friction linings. Existing devices differ in their operating principle and in their structural configuration; in motor-vehicle disk brakes, electrical wear indicators which use a sensor associated with a pad of the brake caliper are widely used. These indicators transmit the signal, which comes from the sensor and is indicative of the wear of the pad, through an electrical wire terminating in a connector which in turn is connected, by means of a corresponding electrical contact element and another electrical wire, to an indicator disposed, for example, on the dashboard of the motor vehicle.

During the assembly of the caliper, particularly of a caliper intended for commercial vehicles, the connector is connected to the caliper purely indirectly by means of the electrical wire which extends from the sensor incorporated in the pad; this constitutes an inconvenience for the assembler and a risk to the integrity of the wire. Moreover, there is a similar disadvantage during the mounting of the caliper on the hub-carrier of a vehicle wheel, since the electrical contact element which is intended to be connected to the connector, usually by a plug-in connection, is suspended on the wire extending from inside the vehicle, without a precise position. It is only upon completion of the mounting that the contact element is inserted in the connector and the connector and/or the wires which extend from it are secured to a fixed part of the structure, for example, to the caliper, by suitable fixing systems.

OBJECTS AND SUMMARY OF THE INVENTION

The object of the present invention is to provide a system for fixing an electrical connector to a disk-brake caliper which overcomes the disadvantages discussed above.

This object is achieved, according to the invention, by the provision of a fixing system as defined and characterized in general in claim 1.

BRIEF DESCRIPTION OF THE DRAWINGS

The invention will be understood further from the following detailed description of an embodiment thereof, given by way of non-limiting example with reference to the appended drawings, in which.

DETAILED DESCRIPTION

Figure 1:
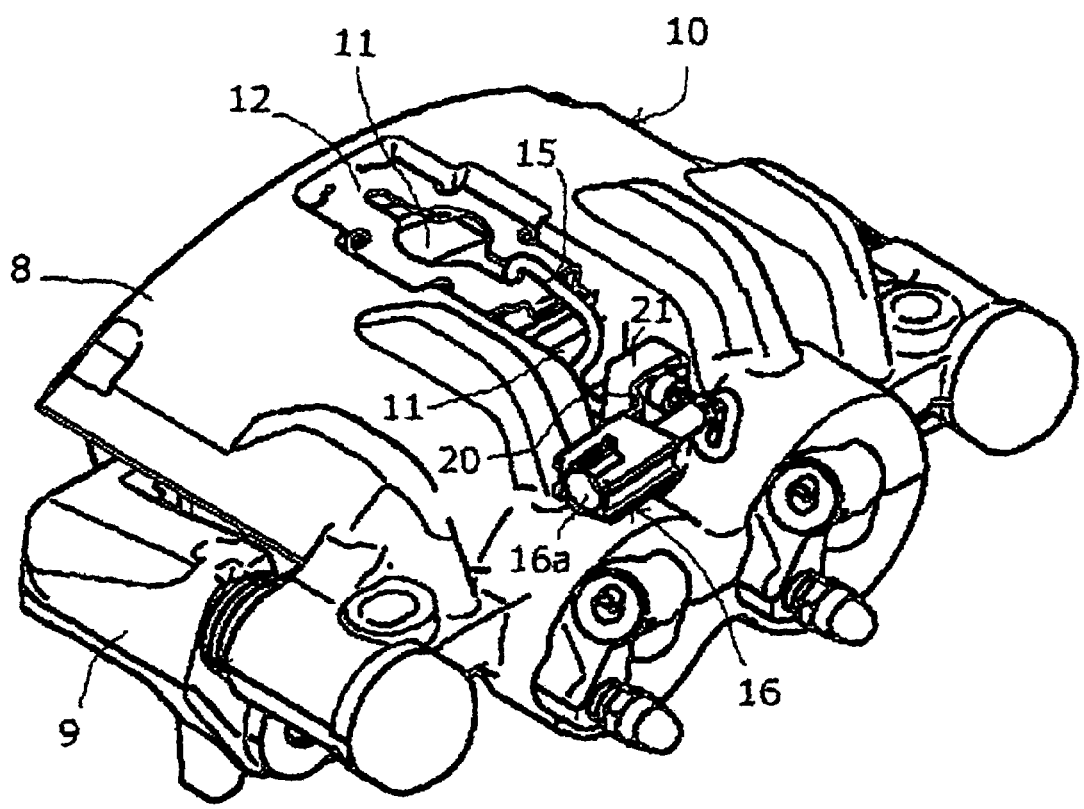
FIG. 1 is a perspective view of a disk-brake caliper with a fixing system according to the invention.
Figure 2:
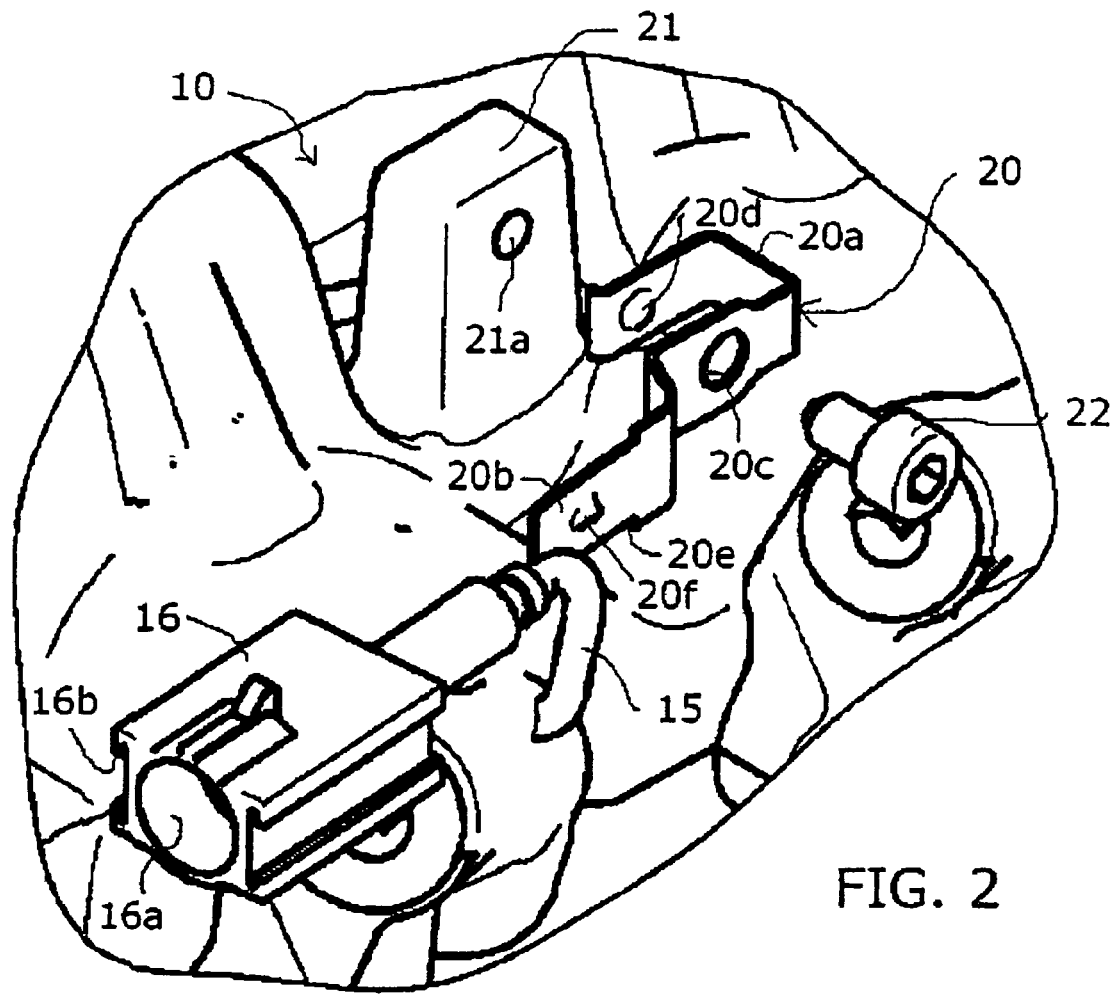
FIG. 2 is a perspective view of an enlarged detail of the caliper of FIG. 1 with parts separated, showing the fixing system according to the invention.

FIG. 1 shows a caliper 10 of a disk-brake of known type, comprising a support bracket 9 and a floating caliper body 8 having two pads 11 provided with friction linings. The pads are housed in suitable seats in the support bracket and are kept in position by a flat spring 12 fixed to the caliper in a manner not visible in the drawing.

A wear sensor, for example, an electrical contact incorporated in one of the pads, has, as an output terminal, an electrical wire 15 which terminates in an electrical connector 16. The connector has a body made of insulating material and a seat 16a for a plug-in contact element, not shown, from which another electrical wire extends in order to transmit the sensor signal to an indicator or other user device.

According to the invention, the electrical connector 16 is fixed to the caliper 10 by means of a coupling element 20 having a portion for the fixing of the connector 16 and a portion for fixing to the caliper 10. In this embodiment, the coupling element 20 is constituted by a strip of sheet-metal bent so as to form a stirrup 20a and an engagement tongue 20b. The fixing system according to the invention also comprises a support block 21 fixed firmly to caliper, in this embodiment formed integrally therewith, and a fixing screw 22. The block 21 has an at least partially-threaded through-hole 21a.

The stirrup 20a of the coupling element 20 has a hole 20c in one of its arms and a nib 20d on the other arm, facing the hole 20c, and is of a size such as to be connected to the block 21 by being fitted around it with the nib 20d snap-fitted in its hole 21a. When the nib 20d is in the hole 21a, the transverse portion of the stirrup is in contact with one side of the block 21 and the hole 20c in the stirrup is aligned with the hole 21a in the block. In this position, the coupling element 20 is also restrained on the caliper 10, although only temporarily. Final fixing is achieved by the screwing and tightening of the screw 22 into the hole 21a in the block 21.

The electrical connector 16 is shaped so as to have a seat for the tongue 20b. In the embodiment shown, this seat is formed by a channel-sectioned groove 16b. The tongue 20b has a width such as to permit a sliding fit in the groove and is connected to the rest of the stirrup by a step. The step forms a stop abutment 20e which limits the insertion of the tongue 20b in the groove 16b. A projection 20f is formed on the tongue and, when the tongue is fully inserted in the groove, engages a corresponding recess in the connector 16; the recess is not visible in the drawing.

Figure 3:
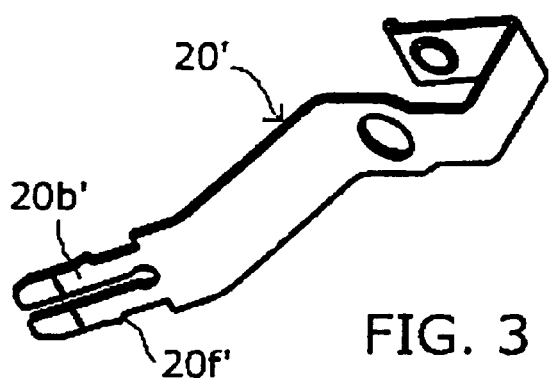
FIG. 3 is a perspective view of a variant of a part of the fixing system according to the invention.

In the variant shown in FIG. 3, the coupling element 20' has an engagement tongue 20b' which is split in two by a deep slot. Each of the resulting two tongues has a sawtooth-like lateral projection 20f'. The seat formed in the connection element (not shown) for the engagement of the tongue has corresponding lateral recesses which permit snap-engagement and longitudinal restraint between the tongue and the electrical connector.

The object of the invention is fully achieved since, during the assembly of the caliper, the connector can be kept in position on the caliper body by the engagement of the tongue of the coupling element in the groove of the connector and the snap-fitting of the stirrup on the support block so that the various assembly stages can be completed without any obstruction by the connector or the wire. The coupling element 20 is then finally clamped by means of the screw 22. After the caliper has been mounted on the hub-carrier, the contact element connected to the wire extending from the interior of the vehicle can advantageously be fitted quickly and safely in the corresponding seat provided on the connector, without the need to use both hands. Moreover, since the connector 16 is firmly fixed, once the contact element is fitted, it is also firmly fixed so that it does not need to be secured to fixed portions of the structure. Moreover, the connector can be removed and replaced quickly when necessary, either during assembly or during subsequent maintenance operations.

What is claimed is:

1. A system for fixing an electrical connector to a disk-brake caliper having a wear sensor electrically connected to the electrical connector, said system comprising:
    a support block firmly fixed to the caliper and having an at least partially-threaded through-hole, a coupling element, and a screw for fixing the coupling element to the support block, the coupling element comprising a portion for fixing to the connector and a portion for fixing the support block, the latter portion having the shape of a stirrup which has, in one arm, a hole for the fixing screw and, on the other arm, a nib opposite the hole, and which has dimensions such as to be connected to the block by being fitted therearound, enabling the nib to be snap-fitted in the hole in the block.

2. A fixing system according to claim 1 in which the coupling element is made of sheet metal.

3. A fixing system according to claim 2 in which the portion for fixing to the connector comprises a tongue which can be engaged in a corresponding seat in the connector.

4. A fixing system according to claim 3 in which the tongue and the corresponding seat of the connector comprise snap-engagement means.

5. A disk brake with a system for fixing an electrical connector to a disk-brake caliper having a wear sensor electrically connected to the electrical connector, said system for fixing an electrical connector to a disk-brake caliper comprising:
    a support block firmly fixed to the caliper and having an at least partially-threaded through-hole, a coupling element, and a screw for fixing the coupling element to the support block, the coupling element comprising a portion for fixing to the connector and a portion for fixing to the support block, the latter portion having the shape of a stirrup which has, in one arm, a hole for the fixing screw and, on the other arm, a nib opposite the hole, and which has dimensions such as to be connected to the block by being fitted therearound, enabling the nib to be snap-fitted in the hole in the block.

6. A disk brake according to claim 5, in which the coupling element is made of sheet metal.

* * * * *